United States Patent
Cobos Reyes et al.

(10) Patent No.: US 9,531,436 B2
(45) Date of Patent: Dec. 27, 2016

(54) DEVICE FOR THE TWO-WAY INDUCTIVE COUPLING OF DATA SIGNALS TO A POWER LINE

(71) Applicant: PREMO SL, Campanillas (ES)

(72) Inventors: Sergio Cobos Reyes, Málaga (ES); Francisco Ezequiel Navarro Pérez, Bobadilla Estación Antequera (ES); Antonio Rojas Cuevas, Riogordo (ES)

(73) Assignee: PREMO, SL, Campanillas (Malaga) (ES)

( * ) Notice: Subject to any disclaimer, the term of this patent is extended or adjusted under 35 U.S.C. 154(b) by 113 days.

(21) Appl. No.: 14/442,096

(22) PCT Filed: Nov. 8, 2013

(86) PCT No.: PCT/EP2013/003366
§ 371 (c)(1),
(2) Date: May 12, 2015

(87) PCT Pub. No.: WO2014/072063
PCT Pub. Date: May 15, 2014

(65) Prior Publication Data
US 2015/0325919 A1    Nov. 12, 2015

(30) Foreign Application Priority Data

Nov. 12, 2012  (ES) .................................. 201231738

(51) Int. Cl.
*H04B 3/54*  (2006.01)
*H01F 38/14*  (2006.01)
(Continued)

(52) U.S. Cl.
CPC ................ *H04B 3/54* (2013.01); *H01F 38/14* (2013.01); *H01Q 1/50* (2013.01); *H01Q 7/06* (2013.01);
(Continued)

(58) Field of Classification Search
CPC .............. H04B 3/56; H04B 2203/5483; H04B 2203/5487; H01F 17/06; H01F 2038/143; H01F 38/14; H01F 30/16
See application file for complete search history.

(56) References Cited

U.S. PATENT DOCUMENTS 4,142,178 A    2/1979  Whyte et al.
4,964,013 A *  10/1990  Kitagawa ................. H01F 3/08
                                                        307/105
(Continued)

FOREIGN PATENT DOCUMENTS

KR        100 542 137 B1    1/2006

*Primary Examiner* — Dean Takaoka
*Assistant Examiner* — Alan Wong
(74) *Attorney, Agent, or Firm* — Hess Patent Law Firm; Robert J. Hess (57) ABSTRACT

The device comprises a current transformer having a ring-shaped magnetic core (10) internally defining an opening (15) for the arrangement of a power line (2) and a winding wound onto the core (10), the core (10) being split into at least two core segments (A, B) articulated to one another. Both core segments (A, B) are furthermore optimized with regard to surface finish and form factor to allow low attenuation in the low-frequency data signal between 50 kHz and 600 kHz transmitted to the power grid.

14 Claims, 6 Drawing Sheets

(51) Int. Cl.
*H01Q 7/06* (2006.01)
*H01Q 1/50* (2006.01)
*H04B 3/56* (2006.01)
*H01F 30/16* (2006.01)

(52) U.S. Cl.
CPC ................ *H04B 3/56* (2013.01); *H01F 30/16* (2013.01); *H01F 2038/143* (2013.01)

(56) References Cited

U.S. PATENT DOCUMENTS

| | | | | |
|---|---|---|---|---|
| 6,933,835 | B2* | 8/2005 | Kline | G02B 6/483 |
| | | | | 370/485 |
| 7,078,996 | B1* | 7/2006 | Cern | H01F 38/14 |
| | | | | 336/175 |
| 7,102,478 | B2* | 9/2006 | Pridmore, Jr. | H04B 3/56 |
| | | | | 336/175 |
| 7,158,003 | B2* | 1/2007 | Cern | H01F 19/08 |
| | | | | 336/175 |
| 7,170,367 | B2* | 1/2007 | Cern | H01P 5/02 |
| | | | | 333/24 R |
| 7,864,012 | B2* | 1/2011 | Merck | H01F 38/14 |
| | | | | 336/175 |
| 9,391,669 | B2* | 7/2016 | Black | H04B 3/50 |
| 2004/0032320 | A1* | 2/2004 | Zalitzky | H04B 3/56 |
| | | | | 307/1 |

* cited by examiner

DEVICE FOR THE TWO-WAY INDUCTIVE COUPLING OF DATA SIGNALS TO A POWER LINE

FIELD OF THE ART

The present invention relates to the data transmission technology over an electrical power transmission line, known as PLC, Power Line Communication or BPL, Broadband Powerline, by means of a two-way inductive coupling of data signals (data carriers) to said power transmission line. According to this principle, an existing medium-voltage power grid can simultaneously transmit electrical power by means of a signal at a standard frequency of 50 Hz (or 60 Hz), for example, and a data stream at a generally higher frequency.

The present invention particularly relates to an inductive communication interface consisting of a current transformer that acts as the interface with the medium-voltage electrical power transmission grid at a frequency range between 50 kHz and 600 kHz, for example.

This transformer allows injecting a low-frequency data signal (between 50 kHz and 600 kHz) into an electric current transmission grid by means of using a tubular magnetic core that is assembled around a line of said grid. For the easy installation of said core in the grid line, there has to be a core split into at least two parts such that the core can be separated, arranged around the power line, and finally closed and its two parts fixed together without having to disconnect the power line for installation.

STATE OF THE ART

Patent EP-B1-1406369 (EICHHOFF) discloses a device for the inductive coupling of electric signals to a voltage supply line by means of a magnetic core of said type, envisaged for coupling to or decoupling from said line high-frequency data-carrying signals between about 2 to 20 MHz.

Patent EP-B1-1895673 (DIMAT) discloses an inductive coupling device for data transmission to a phase of an electrical power line likewise comprising a ring-shaped magnetic core formed by at least two parts suitable for being separated from one another or closed, and envisaged for transmitting over said electrical power line a data signal with a bandwidth or frequency range comprised between 1 MHz and 40 MHz.

US-B2-U.S. Pat. No. 7,859,378 (AMBIENT CO.) discloses an inductive coupling device for PLC where the data signals to be transmitted are greater than 1 MHz.

In all the discussed devices, given that the frequency of the data-carrying signals that are transmitted are very high, said signals are not affected by the transmission frequencies of the power grid which are between 50 Hz and 60 Hz.

Unlike said prior art documents, the device for the two-way inductive coupling of the invention is envisaged for operating with narrow-band data-carrying signals up to 600 kHz, with attenuation comprised between 8 and 5 dB and controlled. Therefore, while with the described devices of the state of the art the range of the transmitted signal is no more than 2-3 Km, with the present inductive coupling device, the range of the link can reach up to 10-15 Km as it operates at lower frequencies.

The proposed device is furthermore envisaged to operate in power grids located outdoor, and for that purpose it has been provided with means to make it waterproof.

DISCLOSURE OF THE INVENTION

The proposed invention consists of a device for the two-way inductive coupling of data signals to a low- or medium-voltage power transmission line, particularly suitable for transmitting and receiving data signals coming from a modulator/demodulator and circulating through a power grid. It can therefore be used in smart grids by allowing the use of G3-PLC, PRIME and other protocols, representing an alternative to 3G, point-to-point or other types of communications.

The proposed device for inductive coupling comprises:
- a ring-shaped magnetic core split into at least a first ring-shaped core segment and a second ring-shaped core segment, articulated to one another, said ring-shaped magnetic core defining an opening for the arrangement therethrough of said electric power line and each of said ring-shaped core segments having two end planar faces which define separating gaps when they are opposite one another and when said ring-shaped core segments are surrounding said electric power line;
- a connector for a coaxial cable for connecting a low-frequency data signal (from 50 kHz to 600 kHz) to be transmitted over the power line to a communication interface; and
- a winding wound onto said ring-shaped magnetic core receiving said data signal from the connector and determining together with the power line a current transformer coupling said data signal between said power line and said winding through the ring-shaped magnetic core.

To be able to operate under the explained conditions with low-frequency data signals (from 50 kHz to 600 kHz), the invention proposes:
- said ring-shaped magnetic core being ferromagnetic with the following properties:
  - $1500 < ui < 150000$
  - $1.2\ T < Bsat < 1.6\ T$
  - $4.8\ uH < A1 < 6\ uH$
  - $-1 < H < +1\ (A/cm)$
  - where:
    - ui is the initial magnetic permeability,
    - Bsat is the magnetic saturation induction expressed in teslas (T),
    - A1 is the inductance factor, and
    - H is the magnetic excitation
- said winding is formed by a copper sheet with two planar winding turns providing a 2:1 transformation ratio in relation to said power transmission line;
- an electrical insulation is arranged between this copper sheet and the ring-shaped magnetic core;
- the planar faces of the ring-shaped magnetic core segments, which are arranged opposite one another when the core is closed, are cut with mirror finish polishing; and
- the assembly of the ring-shaped magnetic core and the winding is surrounded by an overmolded thermoplastic shell with a dielectric strength of 190 kV/cm;

Said communication interface integrates a circuit that has a signal transformer to convert the signal being received through the connector into a signal suitable to be induced. The circuitry for said inductive coupling is well known and can be carried out, for example, by means of a capacitor connected in series between a winding of the signal transformer and the winding of the ring-shaped magnetic core of the induction device surrounding the power line. This interface with the signal transformer is likewise surrounded by said overmolded thermoplastic shell and located on one of the end faces of one of the ring-shaped core segments.

According to a preferred embodiment of the proposed device, it has also been envisaged that:
the thickness of the wall of each segment of the ring-shaped magnetic core is comprised between 20 and 30 mm.
the thickness of the wall of said thermoplastic shell on the inner face surrounding the power line is about 4 mm.
Furthermore, the outer diameter of the device is equal to or less than 100 mm.

In turn, said copper sheet has a width comprised between 8 mm and 12 mm.

The choice of materials with a high saturation induction allows reducing the size and weight of the necessary core segments (and hence, of the device as a whole) for installation in power lines through which currents of up to 300 amperes RMS circulate.

Said first and second core segments are designed so that their form factor is optimal with regard to allowing low attenuation of the low-frequency signal transmitted to the power grid when both core segments are in contact surrounding the power transmission line. The cut and polished finish of the free surfaces of both core segments when the device is installed in a power transmission line allows the low-frequency signal transmitted to said power line by means of the induction due to the current transformer effect, experiences very low attenuation. Very low attenuation is herein understood as attenuations around 8 to 10 dB in the 100 to 250 kHz band and 4 to 6 dB in the 250 to 600 kHz band.

Such attenuation features are furthermore achieved by means of a controlled adjustment of the separation of the two ring-shaped core segments once they are closed. Tapes of controlled thickness adhered to both free faces of the two core segments have been provided for such purpose.

On the other hand, it is necessary to provide a gap between the core segments to prevent saturation of the ring-shaped magnetic core when high current circulates therethrough. To that end, electrical insulation is preferably provided in the present invention. Said electrical insulation can be chosen so that it furthermore offers mechanical protection between the ring-shaped core segments and prevents damages from occurring by offering a damping mechanism. In one embodiment of the present invention, the insulator is an adhesive polyester tape which on one hand is readily attached to the free faces of the core segments intended for coming into contact, and it furthermore works like electrical insulation and damper.

To allow using the device in power lines located outside, the connector for the coaxial cable is waterproof, and the coaxial connector of the cable that is used for conducting the low-frequency signal in the device is also waterproof. Said overmolding material (polyamide or the like) in turn provides waterproof sealing for the core segments and the circuitry or interface of the device.

The waterproofing provided when both core segments are closed is furthermore achieved by adding a gasket made of a flexible material (rubber, silicone or the like) around the surfaces of the two core segments, such that when closed by means of elastic means, such gasket is compressed, providing waterproofing and preventing any contact of moisture or particles from the environment with the cores of the device.

BRIEF DESCRIPTION OF THE DRAWINGS

The preceding and other advantages and features of the invention will be better understood from the following description of an exemplary embodiment in reference to the attached drawings, which must be considered as a non-limiting illustration, in which.

DESCRIPTION OF AN EXEMPLARY EMBODIMENT

Figure 1:
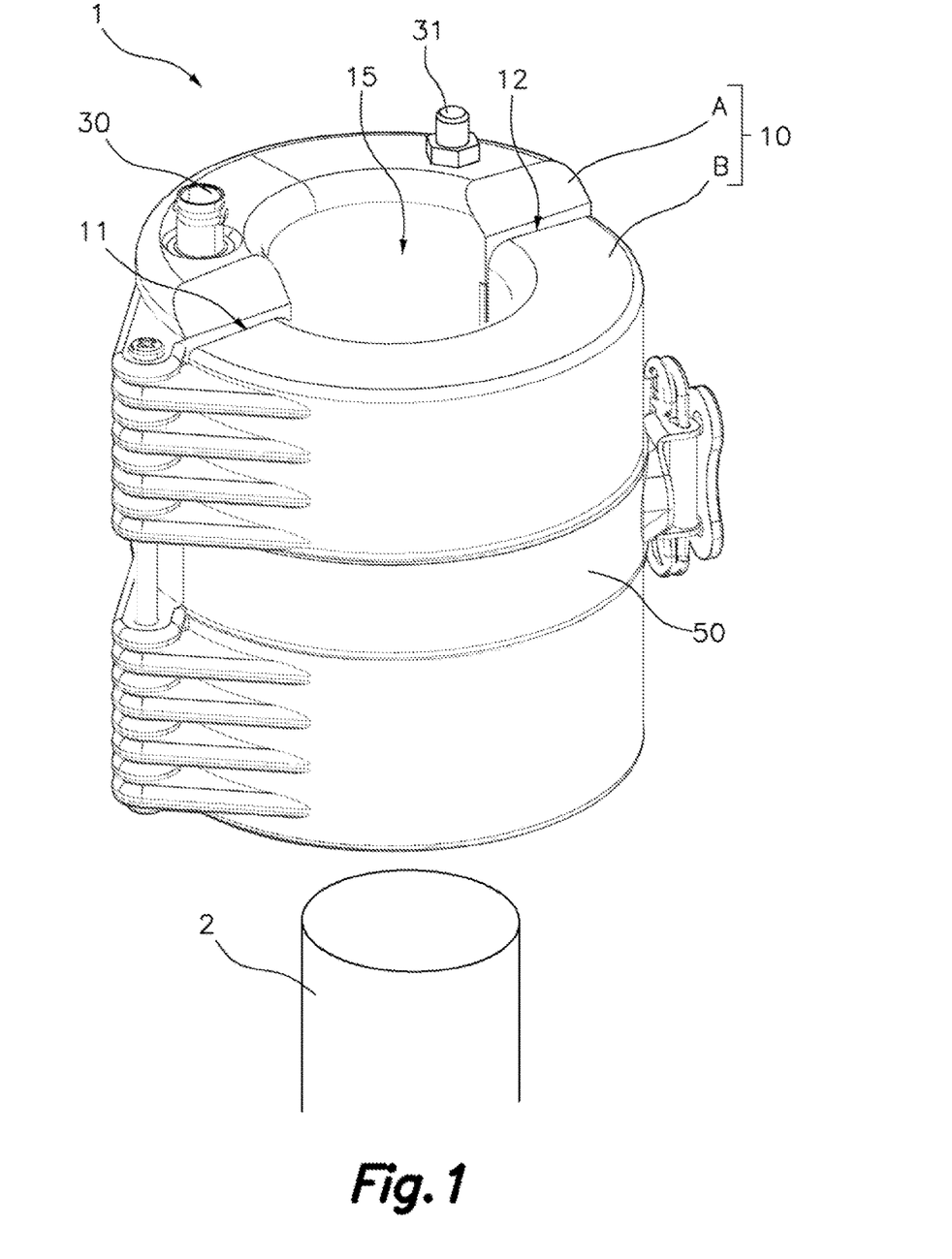
FIG. 1 is an axonometric view of the inductive coupling device in the closed position.
Figure 2:
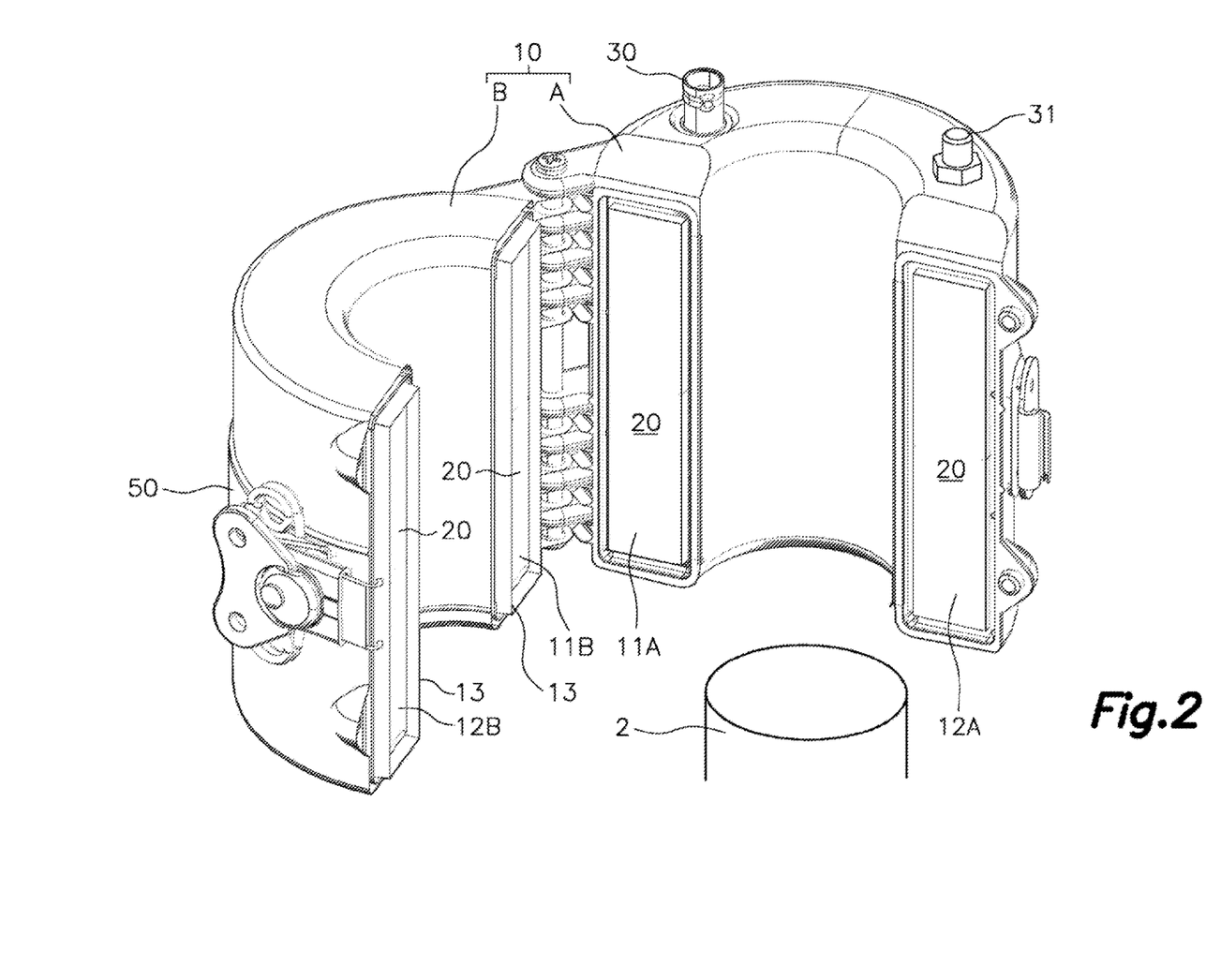
FIG. 2 shows an axonometry of the inductive coupling device in the open position, in order to arrange it around a cable.

According to a first exemplary embodiment shown in FIGS. 1 and 2, the proposed inductive coupling device 1 consists of a ring-shaped magnetic core 10 surrounding an opening 15 sized for being able to arrange therethrough a power transmission line 2, said ring-shaped magnetic core 10 surrounding said power line 2.

In order to place and remove the inductive coupling device 1 without having to act on the power line 2, said ring-shaped magnetic core 10 is split into two segments, as can be seen in FIGS. 1 and 2, comprising a first ring-shaped core segment A and a second ring-shaped core segment B which are articulated to one another.

Figure 5:
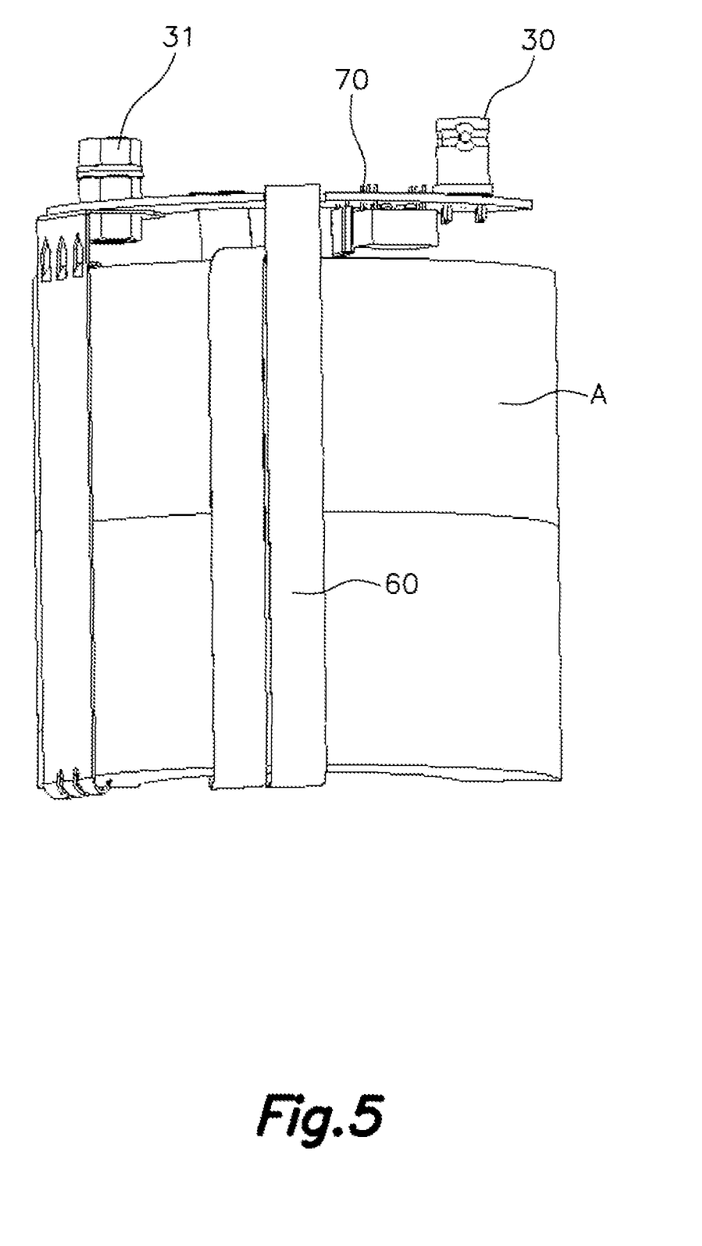
FIG. 5 is a perspective view of the inside of a core segment showing a winding and an interface circuit without the overmolded thermoplastic shell.

The first ring-shaped core segment A has an elevated zone at one of the arc-shaped ends, where a communication interface comprising a circuit with a signal transformer installed on a support plate 70 is installed, as schematically illustrated in FIG. 5.

The first ring-shaped core segment A has two free planar faces 11A and 12A demarcating it which are complementary to two equivalent free planar faces 11B and 12B arranged in the second ring-shaped core segment B, shown in FIG. 2.

When the ring-shaped device 1 is in the coupled position (FIG. 1), said planar faces 11A and 11B are opposite and adjacent to one another and define a separating gap 11. Planar faces 12A and 12B are also adjacent to one another and define a separating gap 12.

FIG. 5 shows one of the segments A of the ring-shaped magnetic core 10 without the overmolded plastic shell which allows seeing the winding formed by a copper sheet 60 with two planar winding turns on said core segment A, said sheet being connected through a circuit board 70 with said connector 30 for a coaxial cable which allows conducting a low-frequency data signal in a two-way manner No additional details of said circuit installed on the board 70 have been provided given its constitution is itself known based on what has previously been mentioned, although a ground connection 31 appearing in the remaining figures has been indicated.

In an also known manner, the sheet 60 of the winding of the magnetic core segment A receives said data signal from the connector 30 and determines together with the power line 2 a current transformer. This arrangement allows coupling the data signal to said power line 2 by means of the magnetic modulation of said winding and said magnetic core 10.

The two segments A and B of the ring-shaped magnetic core 10 as well as the sheet 60 of the winding are protected by means of an overmolded thermoplastic shell which allows protecting the content thereof both against water and from accidental electrical discharges. Said planar faces 11A, 11B, 12A and 12B are only exposed when the inductive coupling device 1 is in the open position, as can be seen in FIG. 2. Advantageously said thermoplastic shell is made by a charged UV-resistant polyamide.

To prevent water from entering into the separating gaps 11 and 12, said planar faces 11A, 11B, 12A and 12B are completely surrounded by waterproofing means 13 which in the case of this embodiment are formed by an elastic O-ring, which allows sealing the separating gaps 11 and 12 when the inductive coupling device 1 is in the coupled position.

Besides, each of said end planar faces 11A, 11B and 12A, 12B of the two ring-shaped core segments A, B incorporate an overlaid tape 20 made of an electrical insulation material such as a sheet of polyester further providing a damping effect when said faces are opposite and very close to one another.

Figure 3:
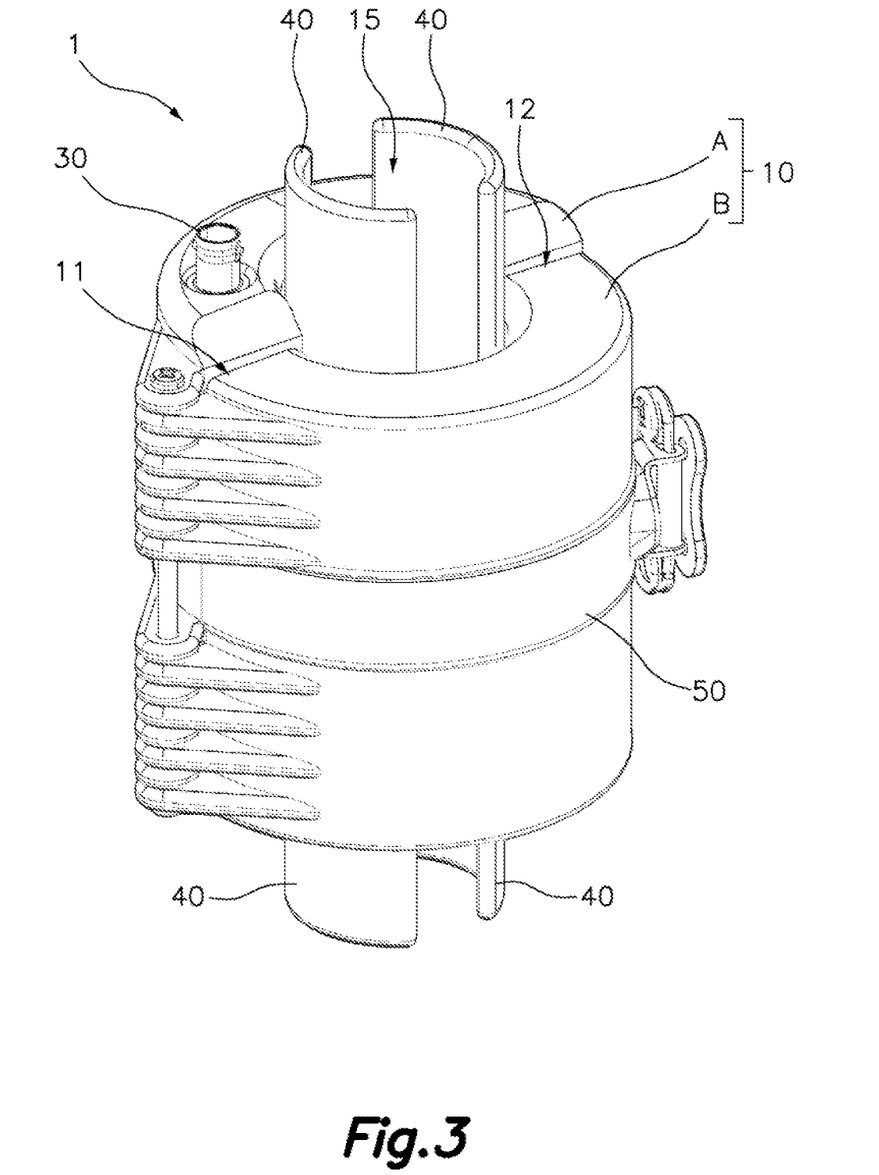
FIG. 3 is an axonometric view of an exemplary embodiment of the inductive coupling device in the closed position, said device being provided with half-round shaped partitions for protecting the separating gaps if the device is installed around a bare cable power line.
Figure 4:
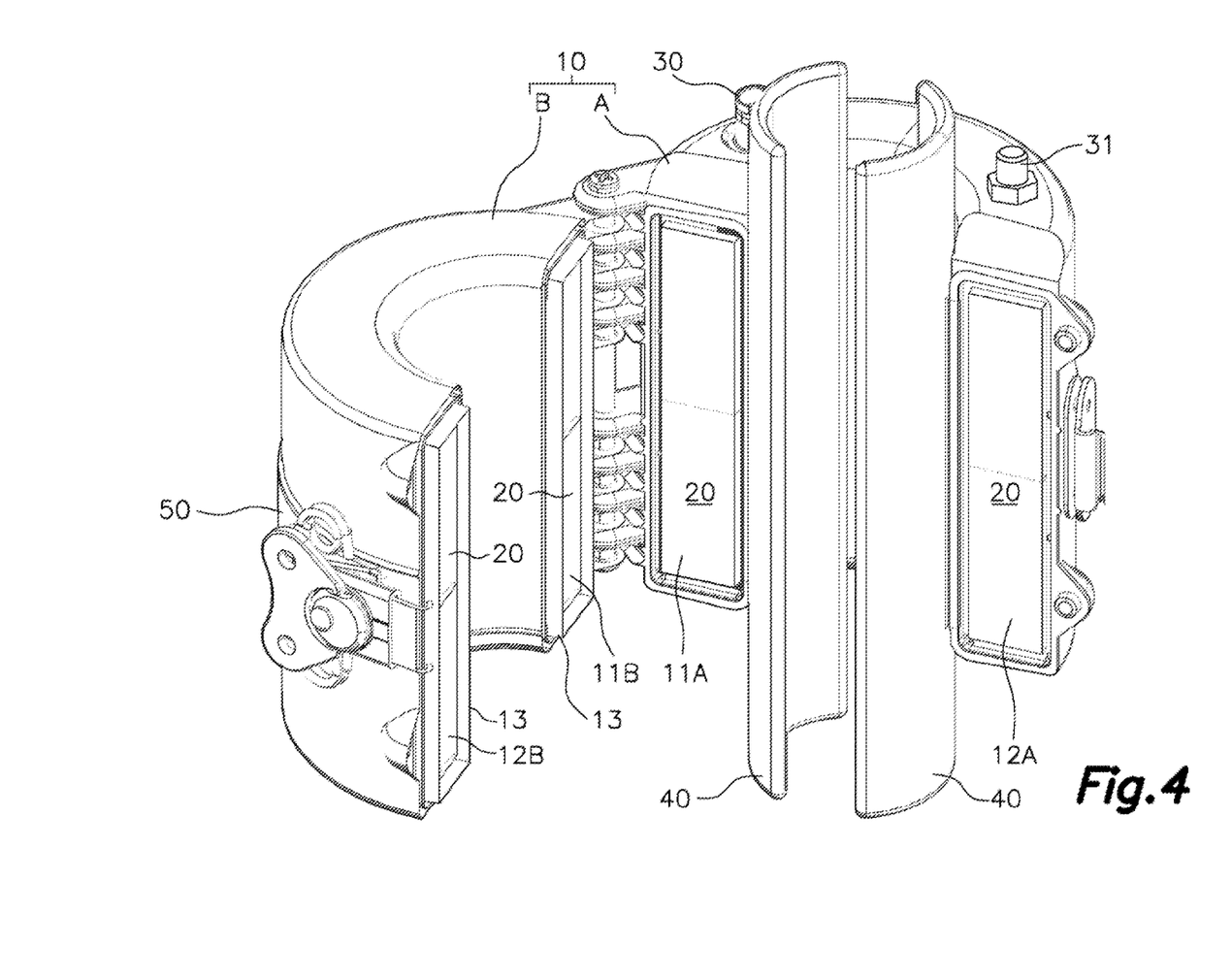
FIG. 4 is an axonometric view of the inductive coupling device in the open position, being provided with said half-round shaped partitions.

If the inductive coupling device 1 is arranged around a bare cable power line 2, half-round shaped partitions 40 interposed between the ring-shaped magnetic core 10 and said bare cable in a position coinciding with said separating gaps 11 and 12 have optionally been envisaged, such that these half-round shaped partitions 40 prevent an electrical discharge from said power line from being able to access said separating gaps 11 and 12. This embodiment is shown in FIGS. 3 and 4. These half-round shaped partitions 40 are fixed to one of the ring-shaped segments A along a contact edge.

In the embodiment shown in the attached drawings, the first ring-shaped core segment A and the second ring-shaped core segment B are fixed in position coupled by means of a known flange 50 acting as a clamp surrounding the ring-shaped magnetic core 10 and being closed by means of a bracket closure.

Figure 6:
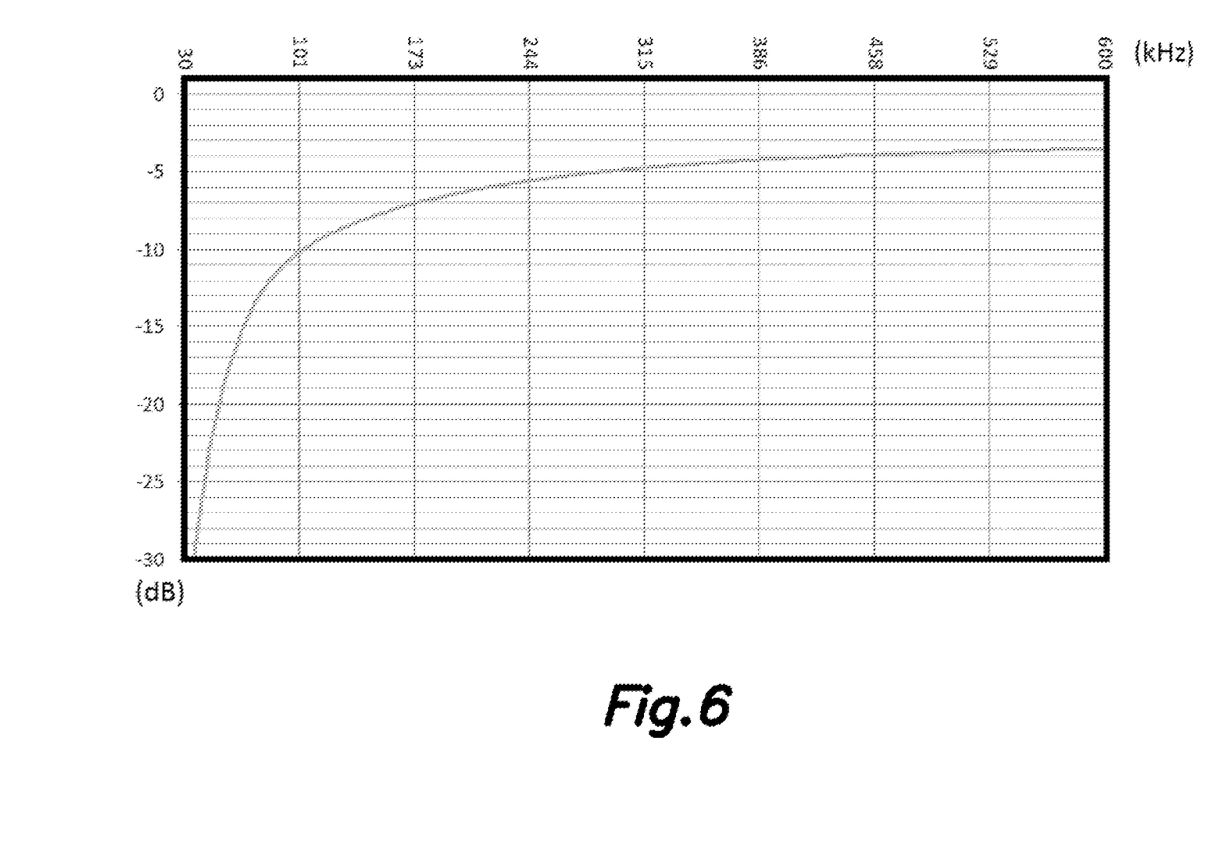
FIG. 6 is a graph showing the attenuation associated with the data signals transmitted by means of the inductive device of this invention.

FIG. 6 shows the distribution of attenuation (in dB) of the data signals transmitted by means of the inductive coupling device of the invention as a function of the frequency thereof (in kHz).

The invention claimed is:

1. A device for the two-way inductive coupling of data signals to a low- or medium-voltage power line (2), comprising:
   a ring-shaped magnetic core (10) split into at least a first ring-shaped core segment (A) and a second ring-shaped core segment (B) articulated to one another, said ring-shaped magnetic core (10) defining an opening (15) for the arrangement therethrough of said power line (2), and each of said ring-shaped core segments (A, B) defining two end planar faces (11A, 12A, 11B, 12B) which define separating gaps (11) and (12) when they are opposite one another and when said ring-shaped core segments are surrounding said electric power line (2);
   a connector (30) for a coaxial cable for inputting and conducting said low-frequency data signal; and
   a winding wound onto said ring-shaped magnetic core (10) receiving said data signal from the connector (30) and determining together with the power line (2) a current transformer coupling said data signal between said power line (2) and said winding through the ring-shaped magnetic core (10);
   characterized in that said ring-shaped magnetic core (10) is made of a ferromagnetic material with the following properties:
   $1500 < ui < 150000$
   $1.2\ T < Bsat < 1.6\ T$
   $4.8\ uH < Al < 6\ uH$
   $-1 < H < +1\ (A/cm)$
   where:
   ui is the initial magnetic permeability,
   Bsat is the magnetic saturation induction expressed in teslas (T),
   Al is the inductance factor, and
   H is the magnetic excitation
   said winding is formed by a copper sheet with two planar winding turns providing a 2:1 transformation ratio in relation to said power line (2);
   electrical insulation is arranged between said copper sheet and the ring-shaped magnetic core (10);
   said opposite planar faces (11A, 11B, 12A, 12B) of the ring-shaped magnetic core segments (A, B) are cut with mirror finish polishing; and
   the assembly of the ring-shaped magnetic core (10) and the winding is surrounded by an overmolded thermoplastic shell with a dielectric strength of 190 Kv/cm;
   such that the device is configured for operating with low-frequency data signals between 50 kHz and 600 kHz with attenuation of 8 to 10 dB in a 100 to 250 kHz band and of 4 to 6 dB in a 250 to 600 kHz band.

2. The device according to claim 1, characterized in that the outer diameter of the device is equal to or less than 100 mm.

3. The device according to claim 1, characterized in that the thickness of the wall of each segment of the ring-shaped magnetic core is comprised between 20 and 30 mm.

4. The device according to claim 1, characterized in that the thickness of the wall of said thermoplastic shell on the inner face surrounding the power line (2) is about 4 mm.

5. The device according to claim 1, characterized in that said copper sheet has a width comprised between 8 mm and 12 mm.

6. The device according to claim 1, characterized in that it integrates waterproofing means (13) making said separating gap (11 and 12), formed by the opposed positioning of two end planar faces (11A, 11B) and (12A, 12B) of each ring-shaped core segment (A, B) when they are opposite one another, impermeable.

7. The device according to claim 6, characterized in that said waterproofing means (13) comprise gaskets continuously surrounding the edges of said two opposite planar faces (11A, 11B) and (12A, 12B) of the ring-shaped core segments (A, B).

8. The device according to claim 1, characterized in that said connector (30) for a coaxial cable is waterproofed.

9. The device according to claim 1, characterized by integrating waterproofing means (13) making said separating gaps (11 and 12), formed by the opposed positioning of two end planar faces (11A, 11B) and (12A, 12B) of each ring-shaped core segment (A, B) when they are opposite one another, impermeable, and in that said connector (30) for a coaxial cable is waterproofed with resistance to immersion in a liquid.

10. The device according to claim 1, characterized in that said thermoplastic shell overmolded on the ring-shaped magnetic core (10) and winding is obtained by a charged UV-resistant polyamide.

11. The device according to claim 1, characterized in that each of said end planar faces (11A, 11B) and (12A, 12B) of the two ring-shaped core segments (A, B) incorporate an overlaid tape (20) made of an electrical insulation material further providing a damping effect when said faces are opposite and very close to one another.

12. The device according to claim 11, characterized in that said tape (20) made of an electrical insulation material is obtained from a sheet of polyester.

13. The device according to claim 1, characterized by further comprising two half-round shaped partitions (40) opposite and spaced from one another, attached to one of the ring-shaped magnetic core segments (A or B) such that when said two segments close around the opening (15), they cover the inner edges of the separating gaps (11 and 12) for application in bare cable power lines.

14. The device according to claim 13, characterized in that said half-round shaped partitions (40) are longer than the ring-shaped magnetic core (10) and extend in cantilever beyond the two faces of said magnetic core segments (A, B), perpendicular to the power line (2).

* * * * *